US012515362B2

(12) United States Patent
Terry

(10) Patent No.: US 12,515,362 B2
(45) Date of Patent: Jan. 6, 2026

(54) SHAVING GEL AND AFTERSHAVE DISPENSING SHAVING RAZOR DEVICE

(71) Applicant: Alonzo Terry, Florissant, MO (US)

(72) Inventor: Alonzo Terry, Florissant, MO (US)

( * ) Notice: Subject to any disclaimer, the term of this patent is extended or adjusted under 35 U.S.C. 154(b) by 202 days.

(21) Appl. No.: 18/367,291

(22) Filed: Sep. 12, 2023

(65) Prior Publication Data

US 2025/0083348 A1 Mar. 13, 2025

(51) Int. Cl.
*B26B 21/44* (2006.01)
*A45D 34/04* (2006.01)
*B26B 21/52* (2006.01)

(52) U.S. Cl.
CPC ............ *B26B 21/446* (2013.01); *A45D 34/04* (2013.01); *B26B 21/44* (2013.01); *B26B 21/521* (2013.01); *A45D 2200/10* (2013.01)

(58) Field of Classification Search
CPC ........ B26B 21/22; B26B 21/44; B26B 21/446
USPC .............................................. 30/41, 41.5, 50
See application file for complete search history.

(56) References Cited

U.S. PATENT DOCUMENTS 4,077,119 A * 3/1978 Sellera .................. B26B 21/446 30/41
4,635,361 A * 1/1987 DeMars ................ B26B 21/446 30/535
4,753,006 A * 6/1988 Howe ................... B26B 21/446 222/105
4,809,432 A * 3/1989 Schauble .............. B26B 21/446 30/535
5,014,427 A 5/1991 Byrne
5,168,628 A * 12/1992 Mock .................. B05B 11/1032 30/535
5,241,751 A * 9/1993 Goh ........................ B26B 21/52 30/41
5,638,601 A * 6/1997 Mol ...................... B26B 21/446 30/41
6,986,207 B2 * 1/2006 Selek ...................... B26B 21/40 30/526
7,007,389 B1 * 3/2006 Arif ....................... A45D 34/04 30/41
7,788,809 B2 9/2010 Tomassetti
7,818,883 B2 * 10/2010 Lax ......................... B26B 21/58 30/41
8,438,735 B2 * 5/2013 De Klerk ................ B26B 21/44 30/41

(Continued)

FOREIGN PATENT DOCUMENTS

DE 10117766 * 10/2002
EP 123765 11/1984

(Continued)

*Primary Examiner* — David J Parsley

(57) ABSTRACT

A shaving gel and aftershave dispensing shaving razor device for storing shaving gel and liquid aftershave includes a shaving razor that has a shaving gel reservoir containing a fluid shaving gel. The shaving gel reservoir is in communication with an outlet nozzle to release the fluid shaving gel onto a user's skin for shaving and the shaving razor has an aftershave reservoir containing a liquid skin treatment. A shaving gel dispenser is in communication with the shaving gel reservoir for urging the fluid shaving gel outwardly from the outlet nozzle. An aftershave dispenser is in communication with the aftershave reservoir to release the liquid skin treatment onto the user's skin.

4 Claims, 7 Drawing Sheets

(56) References Cited

U.S. PATENT DOCUMENTS

| | | | | |
|---|---|---|---|---|
| 8,458,909 | B2 * | 6/2013 | Hawes | B26B 19/40 222/105 |
| 10,759,069 | B2 * | 9/2020 | Johnson | B26B 21/227 |
| 10,864,647 | B2 * | 12/2020 | Alvarez | B26B 21/523 |
| 11,052,556 | B2 * | 7/2021 | Coffindaffer | A61Q 9/02 |
| 2006/0272154 | A1 | 12/2006 | Brevard | |
| 2010/0107415 | A1 * | 5/2010 | Kurzet | B26B 21/446 30/41 |
| 2010/0236072 | A1 * | 9/2010 | Szczepanowski | B26B 21/446 30/526 |
| 2014/0096396 | A1 * | 4/2014 | Pauw | B26B 21/446 30/41.5 |
| 2017/0050327 | A1 * | 2/2017 | Alam | B26B 21/446 |
| 2020/0078968 | A1 * | 3/2020 | Tews | B26B 21/4012 |

FOREIGN PATENT DOCUMENTS

| | | | |
|---|---|---|---|
| EP | 0238333 | | 9/1987 |
| EP | 0427889 | | 5/1991 |
| FR | 2835211 | * | 8/2003 |

* cited by examiner

SHAVING GEL AND AFTERSHAVE DISPENSING SHAVING RAZOR DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dispensing shaving razor devices and more particularly pertains to a new dispensing shaving razor device for storing a dispensing shaving gel and aftershave. The device includes a shaving razor that has a shaving gel reservoir and an aftershave reservoir. The device includes a shaving gel dispenser for dispensing shaving gel from the shaving gel reservoir and an aftershave dispenser for dispensing aftershave from the aftershave reservoir.

(2) Description of Related Art Including Information Disclosed Under 37 CFR 1.97 and 1.98

The prior art relates to dispensing shaving razor devices including a variety of dispensing razor devices that each includes a shaving gel reservoir and various means of dispensing shaving gel from the shaving gel reservoir. In no instance does the prior art disclose a dispensing razor device that includes a shaving gel reservoir and an aftershave reservoir and a shaving gel dispenser for dispensing shaving gel and an aftershave dispenser for dispensing aftershave.

BRIEF SUMMARY OF THE INVENTION

An embodiment of the disclosure meets the needs presented above by generally comprising a shaving razor that has a shaving gel reservoir containing a fluid shaving gel. The shaving gel reservoir is in communication with an outlet nozzle to release the fluid shaving gel onto a user's skin for shaving and the shaving razor has an aftershave reservoir containing a liquid skin treatment. A shaving gel dispenser is in communication with the shaving gel reservoir for urging the fluid shaving gel outwardly from the outlet nozzle. An aftershave dispenser is in communication with the aftershave reservoir to release the liquid skin treatment onto the user's skin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
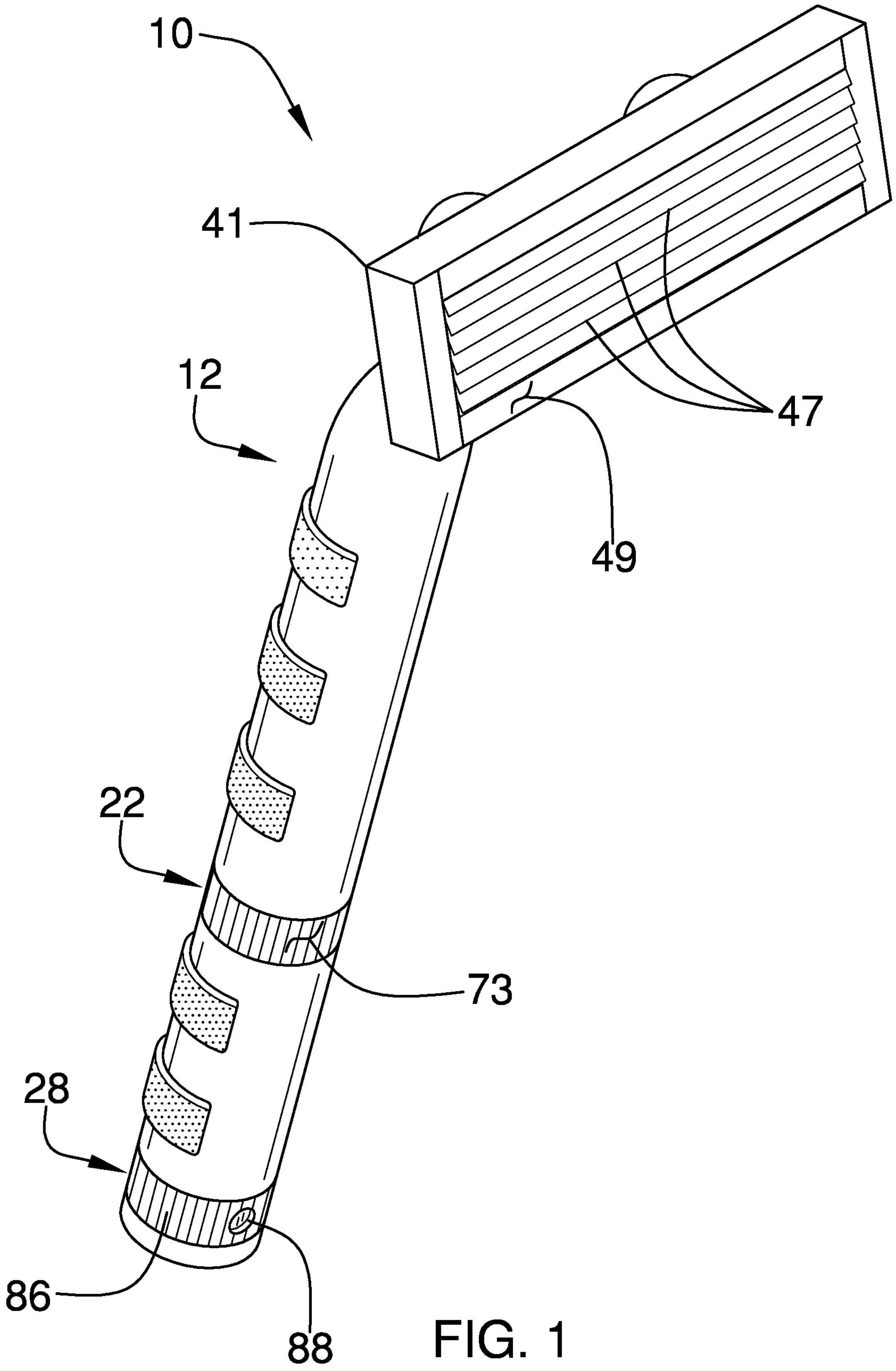
FIG. 1 is a front perspective view of a shaving gel and aftershave dispensing shaving razor device according to an embodiment of the disclosure.
Figure 2:
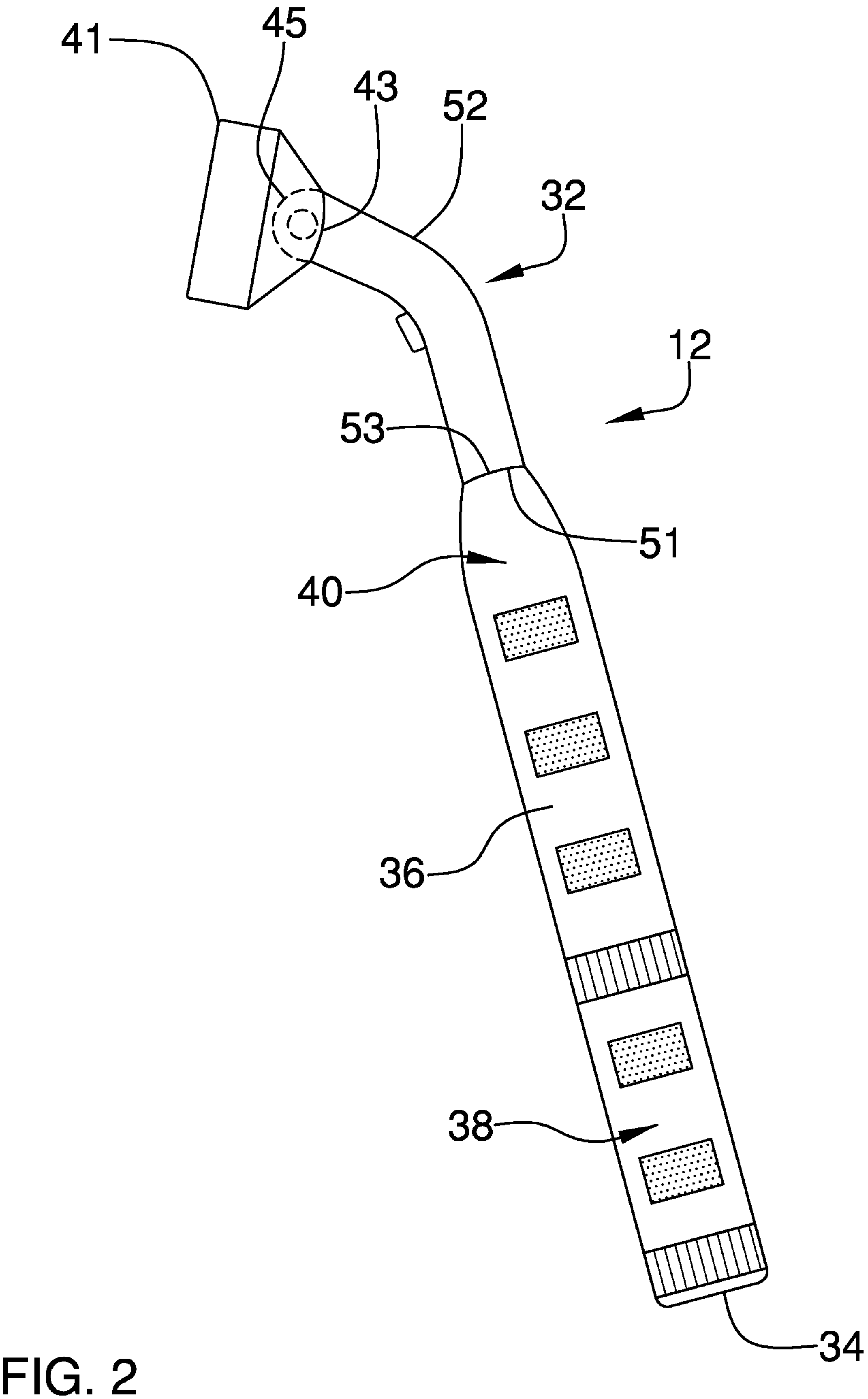
FIG. 2 is a left side view of an embodiment of the disclosure.
Figure 3:
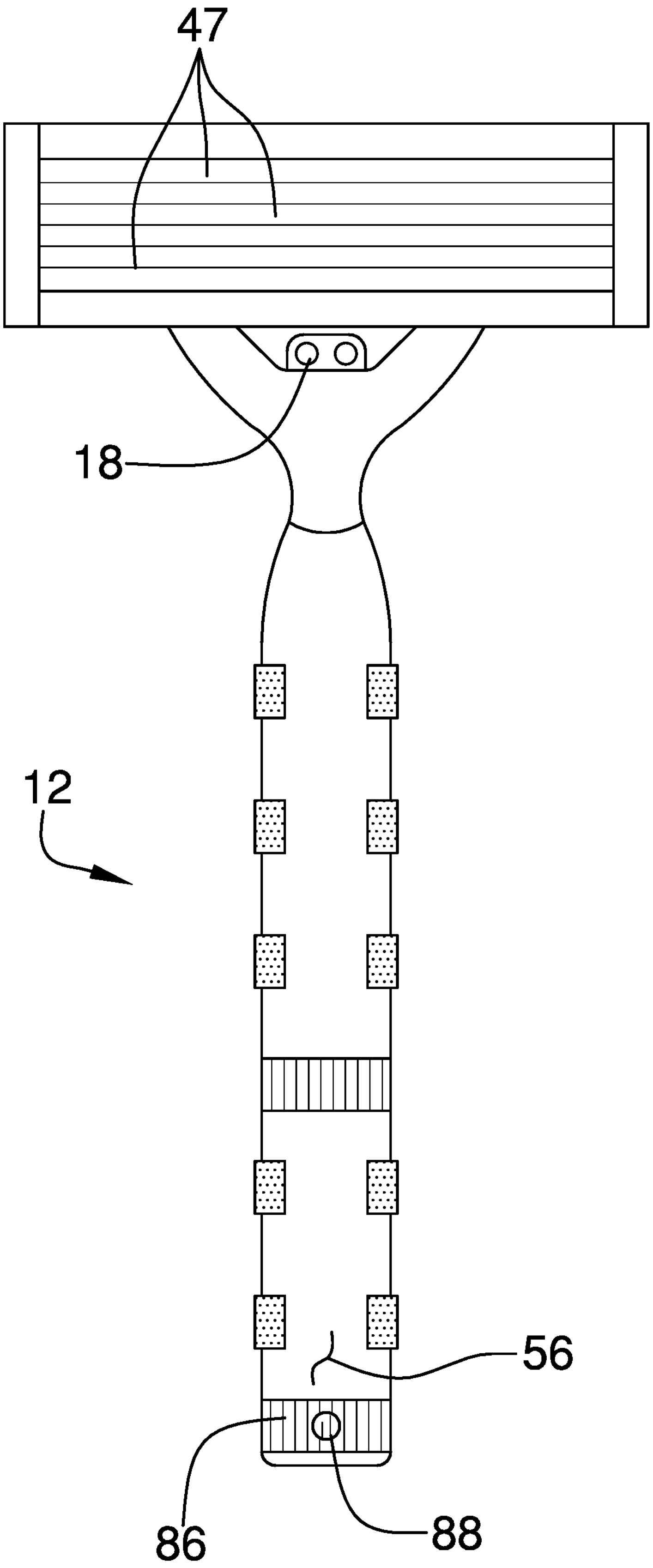
FIG. 3 is a front view of an embodiment of the disclosure.
Figure 4:
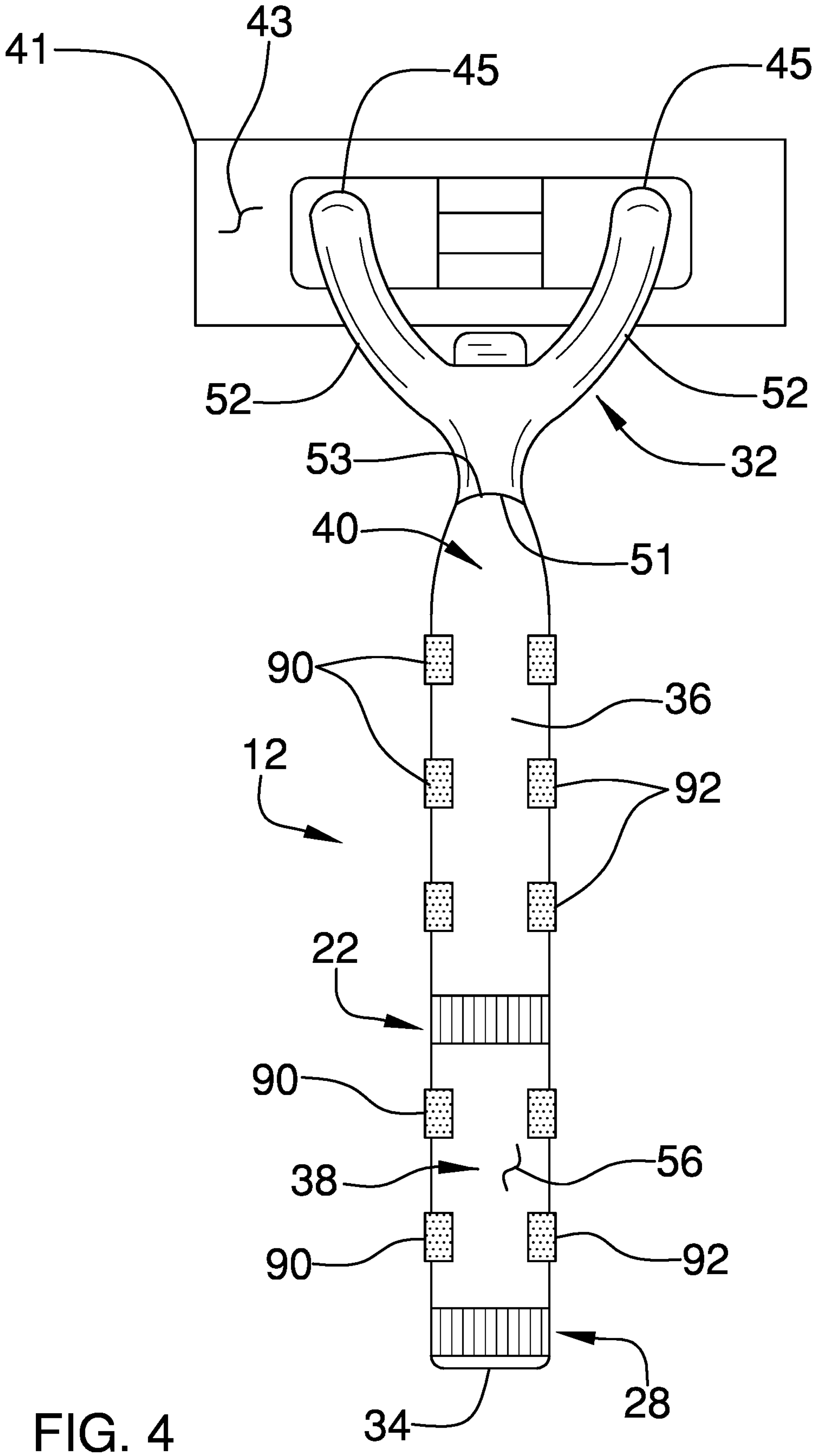
FIG. 4 is a back view of an embodiment of the disclosure.
Figure 5:
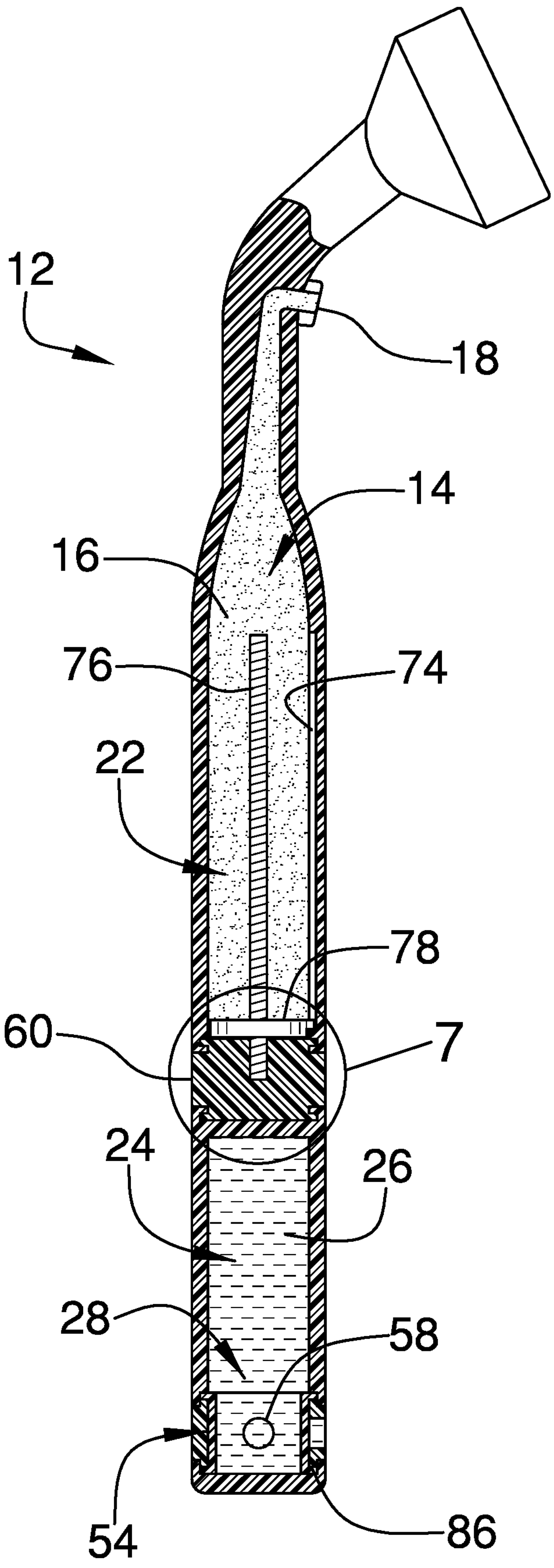
FIG. 5 is a right side cut-away view of an embodiment of the disclosure.
Figure 6:
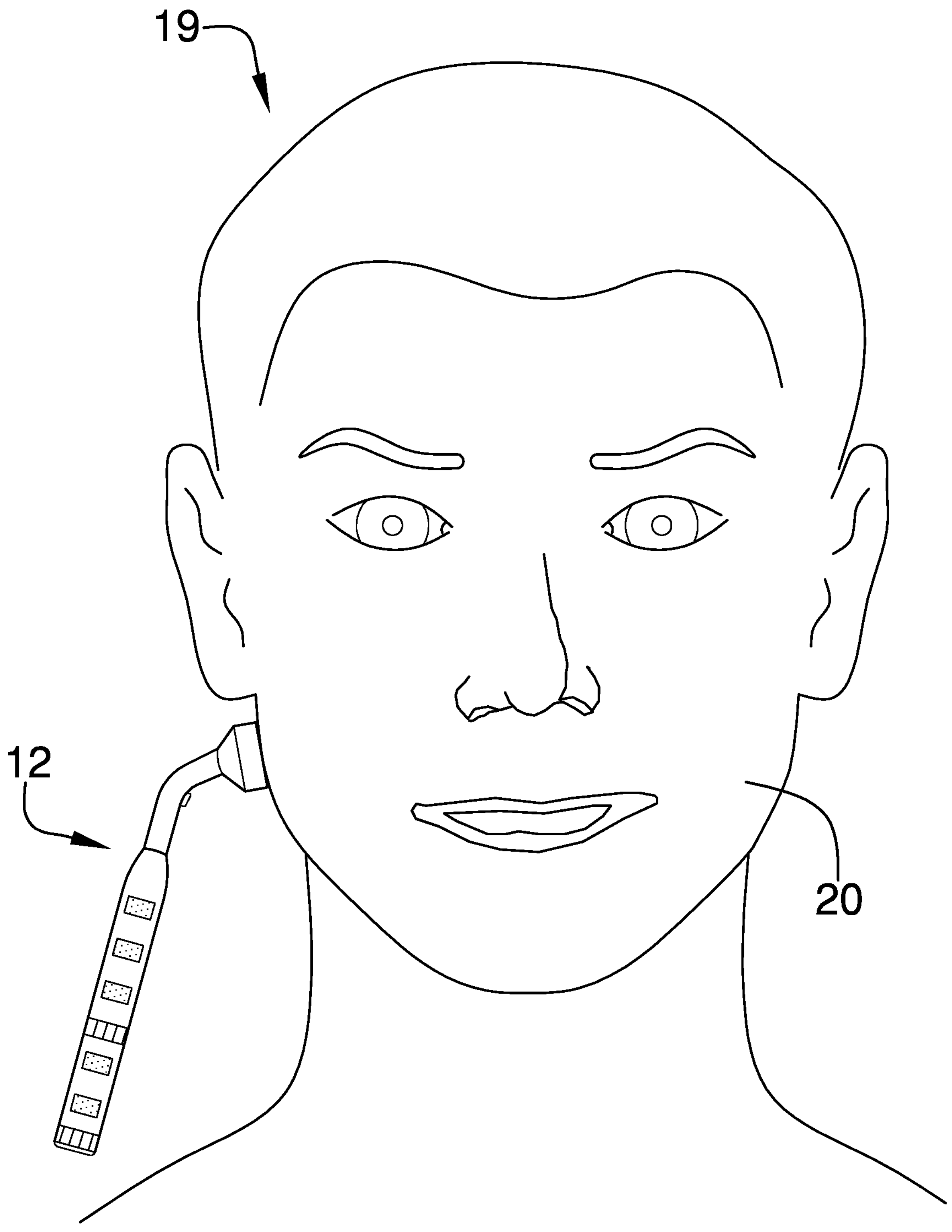
FIG. 6 is a perspective in-use view of an embodiment of the disclosure.
Figure 7:
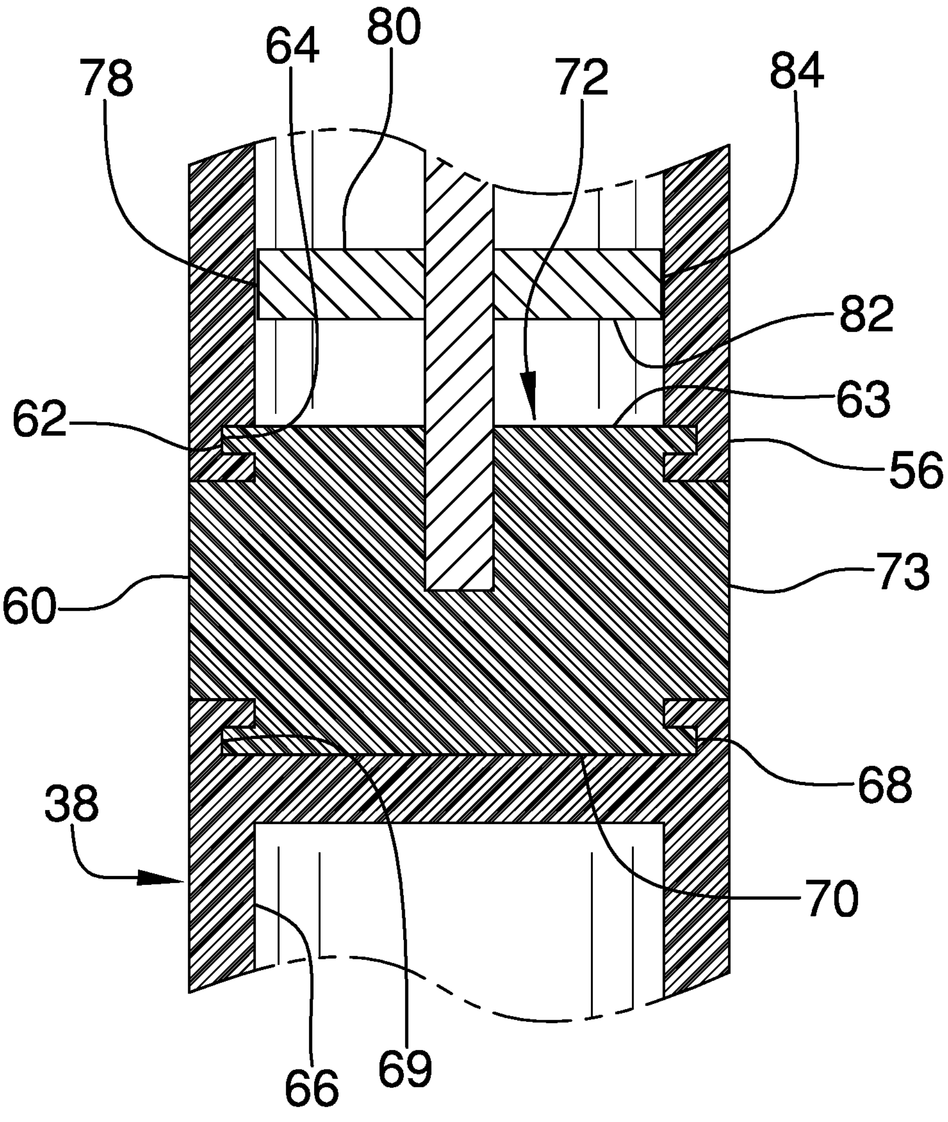
FIG. 7 is a magnified detail view taken from circle 7 of FIG. 5 of an embodiment of the disclosure.

With reference now to the drawings, and in particular to FIGS. 1 through 7 thereof, a new dispensing shaving razor device embodying the principles and concepts of an embodiment of the disclosure and generally designated by the reference numeral 10 will be described.

As best illustrated in FIGS. 1 through 7, the shaving gel and aftershave dispensing shaving razor device 10 generally comprises a shaving razor 12 that has a shaving gel reservoir 14 containing a fluid shaving gel 16. The shaving gel reservoir 14 is in communication with an outlet nozzle 18 of the shaving razor 12 to release the fluid shaving gel 16 onto skin 20 of a user 21 for shaving. The shaving razor 12 has a shaving gel dispenser 22 that is in communication with the shaving gel reservoir 14 and the shaving gel dispenser 22 is actuatable into a dispensing condition for urging the fluid shaving gel 16 outwardly from the outlet nozzle 18. The shaving razor 12 has an aftershave reservoir 24 which contains a liquid aftershave 26 and the shaving razor 12 has an aftershave dispenser 28 that is in communication with the aftershave reservoir 24. The aftershave dispenser 28 is positionable in an open condition to release the liquid aftershave 26 into the user's skin 20. Conversely, the aftershave dispenser 28 is positionable in a closed condition to inhibit the liquid aftershave 26 from flowing out of the aftershave reservoir 24. The fluid shaving gel 16 may be any shaving gel that is approved for use for shaving facial hair or bodily hair and the liquid aftershave 26 may be any type of aftershave that is commonly applied after shaving for soothing skin and for imparting a pleasing scent onto the user's skin 20.

The shaving razor 12 has a head 32, a base 34 and an outside wall 36 extending between the head 32 and the base 34 and the outside wall 36 has a bottom portion 38, a top portion 40. The head 32 is disposed on the top portion 40 and the top portion 40 slopes inwardly between the bottom portion 38 and the head 32. The outside wall 36 associated with each of the bottom portion 38 and the top portion 40 is continuously arcuate about an axis extending between the base 34 and the head 32 such that each of the bottom portion 38 and the top portion 40 has a cylindrical shape. The shaving gel reservoir 14 is positioned in the bottom portion 38 of the outside wall 36 and extends into the head 32. The head 32 has a pair of arms 52 each angling away from a base 51 of the head 32 and the base 51 of the head 32 is attached to a distal end 53 of the top portion 40 of the outside wall 36. Additionally, the outlet nozzle 18 is positioned between the arms 52 and the outlet nozzle 18 is in fluid communication with an interior of the head 32 thereby facilitating the fluid shaving gel 16 to flow outwardly through the outlet nozzle 18.

The shaving razor 12 has a blade cartridge 41 which has a rear surface 43 being pivotally coupled to a distal end 45 of the pair of arms 52. The blade cartridge 41 has a plurality of blades 47 each being integrated into a front surface 49 of the blade cartridge 41 and a strategic angle to shave the user's 21 facial or bodily hair. Each of the plurality of blades 47 is oriented to extend along a line that is oriented perpendicular to a lengthwise axis of the shaving razor 12. The bottom portion 38 of the outside wall 36 has a recess 54 extending into an outside surface 56 of the bottom portion 38 of the outside wall 36. The recess 54 extends around a full circumference of the bottom portion 38 and the recess 54 is spaced from the base 34 of the shaving razor 12. The bottom portion 38 of the outside wall 36 has a first opening 58 extending into the aftershave reservoir 24 thereby facilitating the first opening 58 to release the liquid aftershave 26 from the aftershave reservoir 24 and the first opening 58 is positioned in the recess 54.

The shaving gel dispenser 22 comprises a first disk 60 that is rotatably integrated into the bottom portion 38 of the outside wall 36. The first disk 60 has a first ledge 62 extending laterally away from a point located adjacent to an upper end 63 of the first disk 60 which slidably engages a first recess 64 in an interior surface 66 of the bottom portion 38 of the outside wall 36. The first disk 60 has a second ledge 68 extending laterally away from a point located adjacent to a lower end 70 of the first disk 60 which slidably engages a second recess 69 in the interior surface 66 of the bottom portion 38 of the outside wall 36. In this way the first disk 60 can be rotated about the axis extending between the base 34 and the head 32 of the shaving razor 12. Furthermore, the upper end 63 of the first disk 60 defines a lower threshold 72 of the shaving gel reservoir 14. An outermost surface 73 of the first disk 60 is spaced outwardly from each of the first ledge 62 and the second ledge 68 such that said outermost surface 73 is aligned with the outside surface 56 of the bottom portion 38 of the outside wall 36.

The shaving gel dispenser 22 includes a rail 74 that is integrated into the interior surface 66 of the bottom portion 38 of the outside wall 36 and the rail 74 is oriented to extend along a line that is parallel to the axis extending between the base 34 and the head 32 of the shaving razor 12. The screw 76 is attached to and extends upwardly from the upper end 63 of the first disk 60 such that the screw 76 extends into the shaving gel reservoir 14. The shaving gel dispenser 22 includes a second disk 78 positioned within the shaving gel reservoir 14 and the screw 76 extends through a top surface 80 and a bottom surface 82 of the second disk 78. A perimeter edge 84 of the second disk 78 engages the rail 74 thereby inhibiting the second disk 78 from rotating. The second disk 78 travels upwardly along the screw 76 when the first disk 60 is rotated in a first direction such that the second disk 78 urges the fluid shaving gel 16 to travel outwardly through the pair of arms 52 for releasing the fluid shaving gel 16. Conversely, the second disk 78 travels downwardly along the screw 76 when the first disk 60 is rotated in a second direction.

The aftershave dispenser 28 comprises an annular ring 86 that is rotatably positioned in the recess 54 in the bottom portion 38 of the outside wall 36 of the shaving razor 12. The annular ring 86 has a second opening 88 extending through the annular ring 86. The annular ring 86 is rotatable into a dispensing position having the second opening 88 being aligned with the first opening 58 in the bottom portion 38 of the outside wall 36 thereby facilitating the second opening 88 to release the liquid aftershave 26 from the aftershave reservoir 24. Conversely, the annular ring 86 is rotatable into a closed position having the second opening 88 being offset from the first opening 58 thereby inhibiting the liquid aftershave 26 from flowing from the aftershave reservoir 24.

A set of first grips 90 is each integrated into the outside surface 56 of the bottom portion 38 of the outside wall 36 and the set of first grips 90 are spaced apart from each other and are distributed along a substantial length of the bottom portion 38. A set of second grips 92 is each integrated into the outside surface 56 of the bottom portion 38 of the outside wall 36 and the set of second grips 92 are spaced apart from each other and are distributed along a substantial length of the bottom portion 38. Additionally, the set of first grips 90 are positioned on an opposing side of the outside surface 56 with respect to the second grips 92. Each of the set of first grips 90 and each of the second of second grips 92 are elongated along a line being oriented perpendicular to the lengthwise axis of the shaving razor 12 such that each of the sets of first grips 90 and second grips 92 has a rectangular shape. Additionally, each of the set of first grips 90 and the set of second grips 92 is comprised of a resiliently compressible material, including but not being limited to rubber or silicone, for enhancing comfort and grip for the user 21.

In use, the first disk 60 is rotated until a desired amount of the fluid shaving gel 16 is dispensed from the outlet nozzle 18 to facilitate the fluid shaving gel to be applied to the user's skin 90 for shaving. The annular ring 86 is rotated to align the second opening 88 with the first opening 58 thereby facilitating the liquid aftershave 26 to be dispensed through the second opening 88. In this way the liquid aftershave 26 can be applied to the user's skin 20 when shaving has been completed. In this way all aspects of shaving can be performed with the shaving razor 12 thereby saving storage space in a bathroom, for example, as well as reducing the number of objects that must be carried during travel, for example, for performing shaving practices.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shaving gel and aftershave dispensing shaving razor device for dispensing shaving gel and aftershave, said device comprising:

a shaving razor having a shaving gel reservoir containing a fluid shaving gel, said shaving gel reservoir being in communication with an outlet nozzle being integrated into said shaving razor wherein said shaving gel reservoir is configured to release said fluid shaving gel onto a user's skin for shaving, said shaving razor having an aftershave reservoir containing a liquid skin treatment;

wherein said shaving razor has a shaving gel dispenser being in communication with said shaving gel reservoir, said shaving gel dispenser being actuatable into a dispensing condition for urging said fluid shaving gel outwardly from said outlet nozzle;

wherein said shaving razor has an aftershave dispenser being in communication with said aftershave reservoir, said aftershave dispenser being positionable in an open condition wherein said aftershave dispenser is configured to release said liquid skin treatment onto the user's skin, said aftershave dispenser being positionable in a closed condition to inhibit said liquid skin treatment from flowing out of said aftershave reservoir;

wherein said shaving razor has a head, a base and an outside wall extending between said head and said base;

wherein said outside wall has a bottom portion and a top portion, said head being disposed on said top portion;

wherein said top portion slopes inwardly between said bottom portion and said head;

wherein said outside wall associated with each of said bottom portion and said top portion is continuously arcuate about an axis extending between said base and said head such that each of said bottom portion and said top portion has a cylindrical shape;

wherein said shaving gel reservoir is positioned in said bottom portion of said outside wall and extends into said head;

wherein said head has a pair of arms each angling away from said base of said head, said base of said head being attached to a distal end of said top portion of said outside wall, said base of said head being substantially hollow such that said base of said head is in fluid communication with said shaving gel reservoir;

wherein said outlet nozzle is positioned between said pair of arms and spaced from a bottom edge of said head such that said outlet nozzle is offset from said head, said outlet nozzle being in fluid communication with an interior of said base of said head thereby facilitating said fluid shaving gel to flow outwardly through said outlet nozzle;

wherein said shaving gel dispenser comprises a first disk being rotatably integrated into said bottom portion of said outside wall;

wherein said first disk has a first ledge located adjacent to an upper end of said first disk which slidably engages a first recess in an interior surface of said bottom portion of said outside wall;

wherein said first disk has a second ledge located adjacent to a lower end of said first disk which slidably engages a second recess in said interior surface of said bottom portion of said outside wall wherein said first disk is configured to be rotated by the user about said axis extending between said base and said head of said shaving razor;

wherein said upper end of said first disk defines a lower threshold of said shaving gel reservoir; and wherein said shaving gel dispenser includes:

a rail being integrated into said interior surface of said bottom portion of said outside wall, said rail being oriented to extend along a line being parallel to said axis extending between said base and said head of said shaving razor;

a screw being attached to and extending upwardly from said upper end of said first disk such that said screw extends into said shaving gel reservoir; and a second disk being positioned within said shaving gel reservoir, said screw extending through a top surface and a bottom surface of said second disk, a perimeter edge of said second disk engaging said rail thereby inhibiting said second disk from rotating, said second disk configured for travelling upwardly along said screw when said first disk is rotated in a first direction by the user such that said second disk urges said fluid shaving gel to travel outwardly through said pair of arms for releasing said fluid shaving gel, said second disk configured for travelling downwardly along said screw when said first disk is rotated in a second direction by the user.

2. The device according to claim 1, wherein:

said bottom portion of said outside wall has a recess extending into an outside surface of said bottom portion of said outside wall, said recess extending around a full circumference of said bottom portion, said recess being spaced from said base of said shaving razor; and said bottom portion of said outside wall has a first opening extending into said aftershave reservoir thereby facilitating said first opening to release said liquid skin treatment from said aftershave reservoir, said first opening being positioned in said recess.

3. The device according to claim 2, wherein:

said aftershave dispenser comprises an annular ring being rotatably positioned in said recess in said bottom portion of said outside wall of said shaving razor;

said annular ring has a second opening extending through said annular ring;

said annular ring is rotatable into a dispensing position having said second opening being aligned with said first opening in said bottom portion of said outside wall thereby facilitating said second opening to release said liquid skin treatment from said aftershave reservoir; and said annular ring is rotatable into a closed position having said second opening being offset from said first opening thereby inhibiting said liquid skin treatment from flowing from said aftershave reservoir.

4. A shaving gel and aftershave dispensing shaving razor device for dispensing shaving gel and aftershave, said device comprising:

a shaving razor having a shaving gel reservoir containing a fluid shaving gel, said shaving gel reservoir being in communication with an outlet nozzle of said shaving razor wherein said shaving gel reservoir is configured to release said fluid shaving gel, said shaving razor having a shaving gel dispenser being in communication with said shaving gel reservoir, said shaving gel dispenser being actuatable into a dispensing condition for urging said fluid shaving gel to be dispensed, said shaving razor having a aftershave reservoir containing a liquid skin treatment, said shaving razor having an aftershave dispenser being in communication with said aftershave reservoir, said aftershave dispenser being positionable in an open condition wherein said aftershave dispenser is configured to release said liquid skin treatment into the user's mouth, said aftershave dispenser being positionable in a closed condition to inhibit said liquid skin treatment from flowing out of said aftershave reservoir, said shaving razor having a head, a base and an outside wall extending between said head and said base, said outside wall having a bottom portion and a top portion, said head being disposed on said top portion, said top portion sloping inwardly between said bottom portion and said head, said outside wall associated with each of said bottom portion and said top portion being continuously arcuate about an axis extending between said base and said head such that each of said bottom portion and said top portion has a cylindrical shape, said shaving gel reservoir being positioned in said bottom portion of said outside wall and extends into said head, said head having a pair of arms each angling away from a base of said head, said base of said head being attached to a distal end of said top portion of said outside wall, said base of said head being substantially hollow such that said base of said head is in fluid communication with said shaving gel reservoir, said head being curved between said base of said head and a distal end of said pair of arms such that said head curves away from said top portion of said outside wall, said outlet nozzle being positioned between said pair of arms and spaced from a bottom edge of said head such that said outlet nozzle is offset from said head, said outlet nozzle being in fluid communication with an interior of said base of said head thereby facilitating said fluid shaving gel to flow outwardly through said outlet nozzle, said shaving razor having a blade cartridge which has a rear surface being pivotally coupled to said distal end of said pair of arms, said blade cartridge having a plurality of blades each being integrated into a front surface of said blade cartridge and a strategic angle wherein said plurality of blades is configured to shave a user's facial or bodily hair, each of said plurality of blades being oriented to extend along a line being oriented perpendicular to a lengthwise axis of said shaving razor, said bottom portion of said outside wall having a recess extending into an outside surface of said bottom portion of said outside wall, said recess extending around a full circumference of said bottom portion, said recess being spaced from said base, said bottom portion of said outside wall having a first opening extending into said aftershave reservoir thereby facilitating said first opening to release said liquid skin treatment from said aftershave reservoir, said first opening being positioned in said recess, said shaving gel dispenser comprising:

a first disk being rotatably integrated into said bottom portion of said outside wall, said first disk having a first ledge located adjacent to an upper end of said first disk which slidably engages a first recess in an interior surface of said bottom portion of said outside wall, said first disk having a second ledge located adjacent to a lower end of said first disk which slidably engages a second recess in said interior surface of said bottom portion of said outside wall thereby facilitating said first disk to be rotated about said axis extending between said base and said head of said shaving razor, said upper end of said first disk defining a lower threshold of said shaving gel reservoir;

a rail being integrated into said interior surface of said bottom portion of said outside wall, said rail being oriented to extend along a line being parallel to said axis extending between said base and said head of said shaving razor;

a screw being attached to and extending upwardly from said upper end of said first disk such that said screw extends into said shaving gel reservoir; and a second disk being positioned within said shaving gel reservoir, said screw extending through a top surface and a bottom surface of said second disk, a perimeter edge of said second disk engaging said rail thereby inhibiting said second disk from rotating, said second disk being configured for travelling upwardly along said screw when said first disk is rotated in a first direction by the user such that said second disk urges said fluid shaving gel to travel outwardly through said pair of arms for releasing said fluid shaving gel, said second disk being configured for travelling downwardly along said screw when said first disk is rotated in a second direction by the user; and wherein said aftershave dispenser comprises an annular ring being rotatably positioned in said recess in said bottom portion of said outside wall of said shaving razor, said annular ring having a second opening extending through said annular ring, said annular ring being rotatable into a dispensing position having said second opening being aligned with said first opening in said bottom portion of said outside wall thereby facilitating said second opening to release said liquid skin treatment from said aftershave reservoir, said annular ring being rotatable into a closed position having said second opening being offset from said first opening thereby inhibiting said liquid skin treatment from flowing from said aftershave reservoir.

* * * * *